Nov. 27, 1934.   H. E. SHEPHERD   1,982,235
BRAKE
Filed Feb. 17, 1934   4 Sheets-Sheet 1

Inventor
Herbert E. Shepherd
By Clarence A. O'Brien
Attorney

Nov. 27, 1934.  H. E. SHEPHERD  1,982,235
BRAKE
Filed Feb. 17, 1934   4 Sheets-Sheet 2

Inventor
Herbert E. Shepherd.
By Clarence A. O'Brien
Attorney

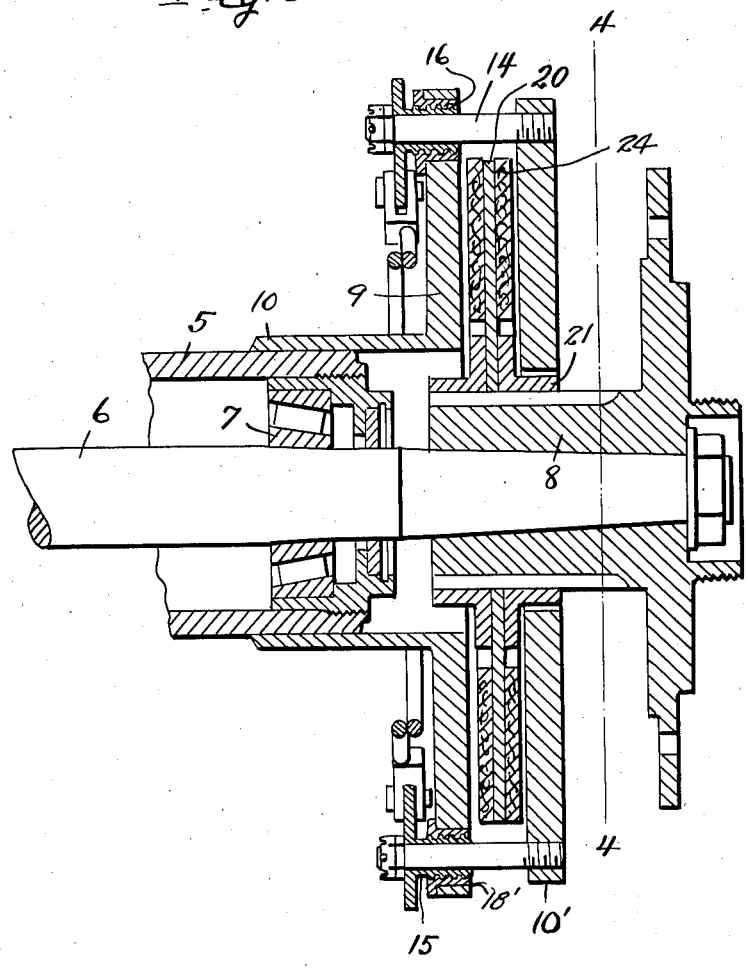

Nov. 27, 1934.   H. E. SHEPHERD   1,982,235
BRAKE
Filed Feb. 17, 1934   4 Sheets-Sheet 4

Inventor
Herbert E. Shepherd
By Clarence A. O'Brien
Attorney

Patented Nov. 27, 1934

1,982,235

UNITED STATES PATENT OFFICE 1,982,235

BRAKE

Herbert Edmond Shepherd, Trail,
British Columbia, Canada

Application February 17, 1934, Serial No. 711,790

1 Claim. (Cl. 188—72)

The present invention relates to new and useful improvements in brakes and more particularly to novel brakes for automobiles.

The prime object of the invention resides in the provision of a particularly simple and efficient disk brake which is inexpensive to manufacture and repair, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 3 is a longitudinal section taken substantially on the line 3—3 of Figure 1.

Figure 1:
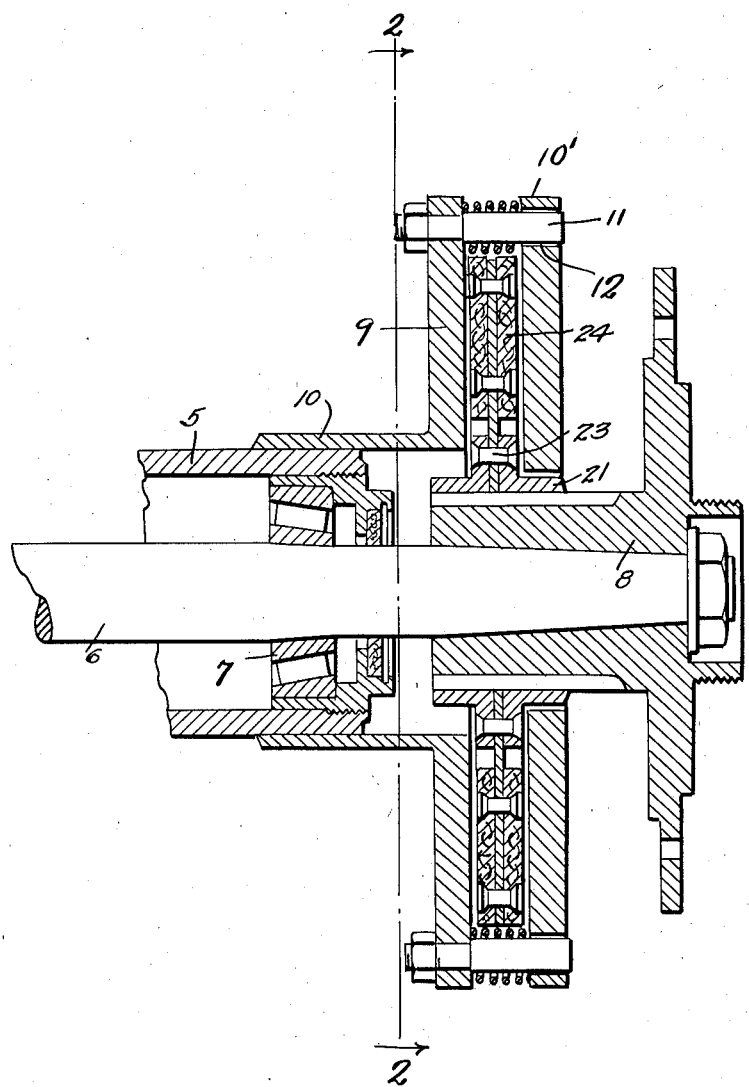
Figure 1 is a vertical longitudinal section taken through a brake embodying the features of my invention substantially on the line 1—1 of Figure 2.
Figure 2:
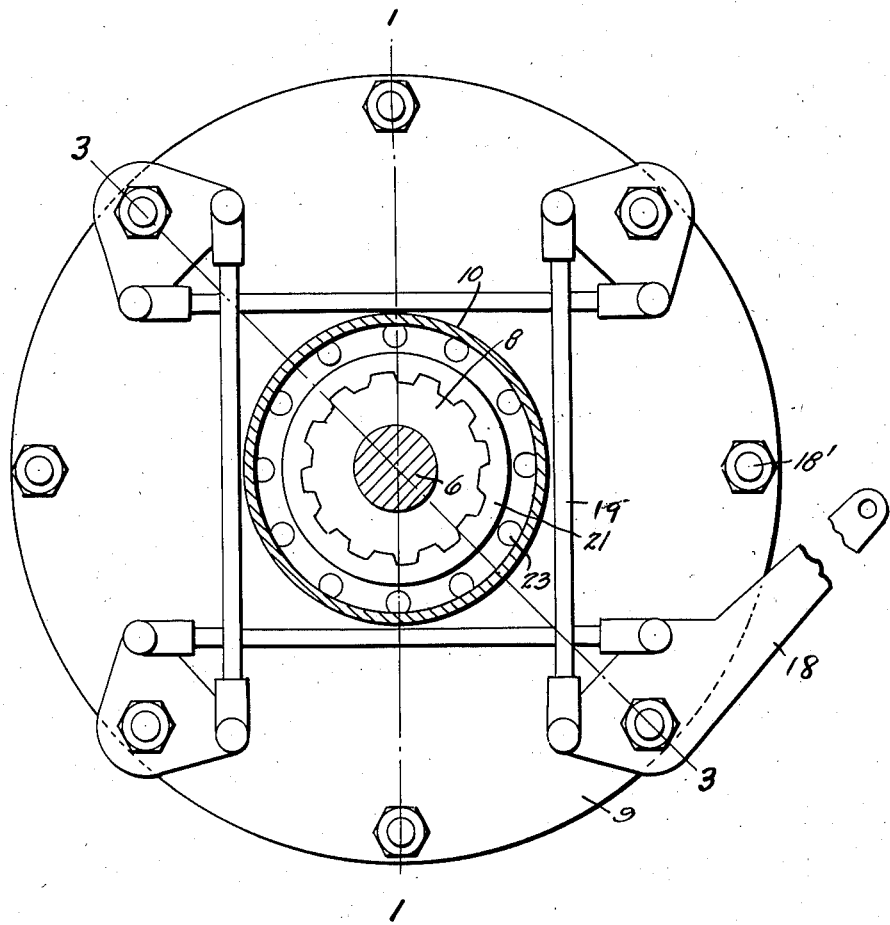
Figure 2 is a vertical transverse section therethrough taken substantially on the line 2—2 of Figure 1.
Figure 6:
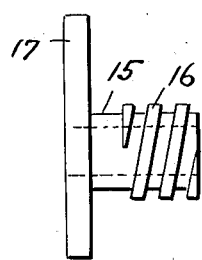
Figure 6 is a detail elevation of one of the rockable screw members.
Figure 4:
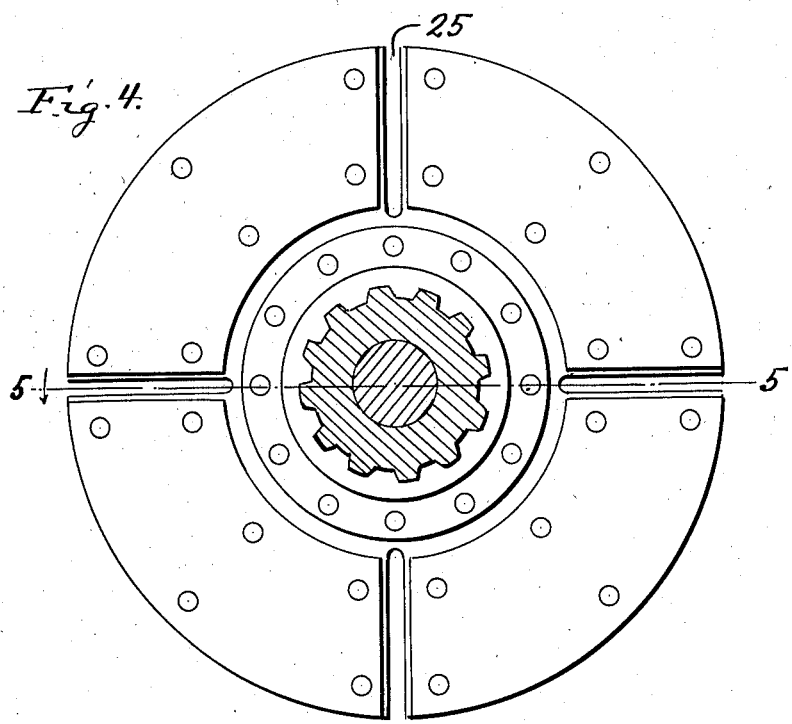
Figure 4 is a side elevation of the disk.
Figure 5:
Figure 5 is a sectional view therethrough substantially on the line 5—5 of Figure 4.

Referring to the drawings in detail it will be seen that numeral 5 denotes an axle shaft housing in which is an axle shaft 6 journalled in a bearing structure 7 and having a hub 8 fixed thereto. Numeral 9 denotes a stationary disk formed on a collar 10 fixed over the housing 5. Numeral 10' denotes a movable disk. Pins or bolts 11 extend from the disk 9 through openings 12 in the disk 10'. Other bolts 14 are threaded in the disk 10' and extend through sleeves 15 which are threaded in openings in the disk 9 as indicated at 18'. Plates 17 are formed on the sleeves 15. One of these plates is provided with a lever extension 18. There are four of the plates 17 in the present exemplification of the invention and rods 19 are pivotally connected with corners of the plates and cross each other so that the actuation of one plate swings all of the rest of the plates in a similar direction. Therefore actuation of the lever 18 controls all of the plates in like manner, and in this way it will be seen that the disk 10' may be moved toward or away from the disk 9.

A disk 20 is splined on the hub 8 to rotate therewith by means of a pair of hub structures 21 riveted thereto as at 23. On the disk 20 are segments 24 of brake lining material. Between the segments the disk is provided with radial slots 25.

From the above detailed description it will be readily appreciated that by swinging the lever 18 in one direction the disk 10 engages the brake lining on one side of the disk 20 and moves this disk 20 into engagement with the stationary disk 9 to produce the necessary and desired braking action. Obviously when the lever 18 is moved in the other direction the reverse operations take place and the brake action is released.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a brake structure, a stationary disk, a secondary disk, a movable disk for rotation between the first mentioned disks, and means for moving the second mentioned disk toward the first mentioned disk to frictionally engage the third mentioned disk between the first two mentioned disks, said means comprising bolts fixed in the second mentioned disk and extending through openings in the first mentioned disk, sleeves threadedly mounted in said openings and disposed about the bolts, plates on the sleeves, a plurality of rods pivotally connected to corners of the plates and crossing each other and one of the plates having a lever which when actuated will cause the rocking of the plates and sleeves in similar directions.

HERBERT EDMOND SHEPHERD.